(12) United States Patent
Nieuwlands

(10) Patent No.: US 9,674,914 B2
(45) Date of Patent: Jun. 6, 2017

(54) DRIVER UNIT AND DRIVING METHOD FOR DRIVING A LOAD

(71) Applicant: PHILIPS LIGHTING HOLDING B.V., Eindhoven (NL)

(72) Inventor: Eric Johannus Hendricus Cornelis Maria Nieuwlands, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/027,906

(22) PCT Filed: Sep. 30, 2014

(86) PCT No.: PCT/EP2014/070945
§ 371 (c)(1),
(2) Date: Apr. 7, 2016

(87) PCT Pub. No.: WO2015/052043
PCT Pub. Date: Apr. 16, 2015

(65) Prior Publication Data
US 2016/0242250 A1 Aug. 18, 2016

(30) Foreign Application Priority Data
Oct. 7, 2013 (EP) .................................. 13187552

(51) Int. Cl.
H05B 33/08 (2006.01)
H05B 37/02 (2006.01)
H02J 1/14 (2006.01)

(52) U.S. Cl.
CPC ............ *H05B 33/0845* (2013.01); *H02J 1/14* (2013.01); *H05B 33/0842* (2013.01); *H05B 37/0245* (2013.01)

(58) Field of Classification Search
CPC ............ H05B 33/0815; H05B 33/0818; H05B 33/0884; H05B 33/0809; H05B 33/0848;
(Continued)

(56) References Cited

U.S. PATENT DOCUMENTS

2010/0060175 A1* 3/2010 Lethellier .......... H05B 33/0815
315/164
2010/0176733 A1* 7/2010 King .................. H05B 37/0245
315/158

(Continued)

FOREIGN PATENT DOCUMENTS

WO WO2011024101 A1 3/2011
WO WO2012029053 A1 3/2012
(Continued)

*Primary Examiner* — Douglas W Owens
*Assistant Examiner* — Syed M Kaiser

(57) ABSTRACT

Embodiments described herein comprise a driver unit for driving a load including a plurality of load elements. In one example, the driver unit comprises a plurality of driver devices connected to the load elements for driving the load elements individually. The driver unit comprises a control interface for receiving a power control signal. Each driver device comprises a driver interface connected to the control interface for receiving the power control signal including single general power demand to be set by the driver unit, and each driver device is adapted to determine an individual power level on the basis of the single general power demand and to drive the load elements according to the individual power signal, so that at least one of the plurality of driver devices is configured to be switched off when the single general power demand is decreased.

14 Claims, 3 Drawing Sheets

(58) Field of Classification Search
CPC .............. H05B 33/0896; H05B 37/029; H05B 37/0245; H05B 37/0254
USPC ................ 315/291, 294, 224, 297, 364, 161
See application file for complete search history.

(56) References Cited

U.S. PATENT DOCUMENTS

| | | | |
|---|---|---|---|
| 2010/0327766 A1* | 12/2010 | Recker | H02J 9/02 315/291 |
| 2011/0140614 A1* | 6/2011 | Young | H02M 1/4225 315/185 R |
| 2011/0276193 A1* | 11/2011 | Bowman | H05B 37/029 700/295 |
| 2012/0139450 A1 | 6/2012 | Pang et al. | |
| 2012/0262093 A1* | 10/2012 | Recker | H05B 33/0854 315/308 |
| 2013/0038219 A1 | 2/2013 | Dau et al. | |
| 2013/0257289 A1* | 10/2013 | VanWagoner | H05B 37/0209 315/152 |
| 2014/0159585 A1* | 6/2014 | Reed | H05B 33/0815 315/130 |

FOREIGN PATENT DOCUMENTS

| | | |
|---|---|---|
| WO | WO2012137092 A1 | 10/2012 |
| WO | WO2012137097 A1 | 10/2012 |
| WO | WO2012137104 A1 | 10/2012 |
| WO | WO2012164683 A1 | 12/2012 |

\* cited by examiner

DRIVER UNIT AND DRIVING METHOD FOR DRIVING A LOAD

CROSS-REFERENCE TO PRIOR APPLICATIONS

This application is the U.S. National Phase application under 35 U.S.C. §371 of International Application No. PCT/EP2014/070945, filed on Sep. 30, 2014, which claims the benefit of European Patent Application No. 13187552.8, filed on Oct. 7, 2013. These applications are hereby incorporated by reference herein.

FIELD OF THE INVENTION

The present invention relates to a driver unit for driving a load including a plurality of load elements, in particular a plurality of lighting elements including one or more LEDs. Further, the present invention relates to a driving method for driving a load including a plurality of load elements, in particular a plurality of lighting elements including one or more LEDs. The present invention relates finally to a light unit comprising a plurality of lighting elements including one or more LEDs.

BACKGROUND OF THE INVENTION

In the field of driver devices for luminaire applications, it is known to use multiple drivers which are individually accessible via a communication network, wherein a standard like DMX can be used to control each of the drivers separately. Since each driver has a minimum dimming level, the overall output of the luminaire is limited to the dimming level of each of the drivers if all drivers are activated. It is possible to achieve a lower power level of the luminaire by turning certain drivers off so that merely a few drivers provide electrical power to the luminaire. In this case, the total dimming level is reduced to a level below the dimming level of each of the drivers.

To set an individual power level by each of the drivers within the luminaire and to switch certain drivers off in order to achieve a lower total dimming level, each of the drivers of the luminaire are usually controlled by a central control unit individually so that the technical effort for reducing the overall dimming level is increased.

From US 2013/0038219 A1 a dimmable lighting device is known, wherein a plurality of LEDs are controlled by an internal controller and switched selectively on and off in order to reduce the level of emitted light. The disadvantage of this lighting device is that a separate controller is necessary to control the LEDs and that each LED is not dimmable so that the total dimming level of the lighting device is limited to the light emitted by at least one LED.

WO 2012/137092 A1 discloses a device and a method for dynamic load control in lighting systems, wherein a power consumption of at least one group of a plurality of groups of lighting devices is controlled, wherein each group comprises change range indicating values, by which energy consumption of the respective group can be changed.

SUMMARY OF THE INVENTION

It is therefore an object of the present invention to provide a driver unit and a driving method for driving a load including a plurality of load elements which is dimmable to a lower power level with low technical effort.

According to one aspect of the present invention, a driver unit is provided for driving a load including a plurality of load elements, in particular a plurality of lighting elements including one or more LEDs, comprising:
a plurality of driver devices connected to the load elements for driving the load elements individually,
a control interface for receiving a power control signal including a single general power demand to be set by the driver unit,
wherein each driver device comprises a driver interface connected to the control interface for receiving the power control signal including the single general power demand, and
wherein each driver is adapted to determine an individual power level on the basis of the single general power demand and to drive the load elements according to the individual power level.

According to another aspect of the present invention, a driving method is provided for driving a load including a plurality of load elements, in particular a plurality of lighting elements including one or more LEDs, comprising the steps of:
providing a power control signal to a plurality of driver devices for driving the load elements, wherein the power control signal includes a single general power demand,
determining an individual power level by means of each of the driver devices on the basis of the single general power demand, and
driving the load elements individually according to the individual power level.

Preferred embodiments of the invention are defined in the dependent claims. It shall be understood that the claimed method has similar and/or identical preferred embodiments as the claimed device and as defined in the dependent claims.

The present invention is based on the idea to reduce the total dimming level of the load by individually driving the load elements by the plurality of driver devices, wherein each of the driver devices receives the power control signal and determines the individual power level on the basis of the single general power demand. Hence, each driver device sets an individual power level for driving the load elements individually on the basis of the single general power demand so that a separate control unit for controlling each of the driver devices can be omitted. Consequently, a deeper dimming of the electrical power provided to the load is possible without the need of a separate control unit for individually controlling the driver devices and, therefore, a deeper dimming with low technical effort is possible.

In a preferred embodiment, each driver device is connected to one load element for driving the respective load element individually. This is a possibility to drive the load elements of the load separately and independently from each other and provides a large power spectrum which can be provided to the load.

In a preferred embodiment, the driver unit further comprises a control unit for providing the power control signal to the driver devices including the single general power demand. This is a possibility to control the driver devices with low technical effort since the control unit provides the single general power demand to each of the driver devices.

In a preferred embodiment, each driver device has the same driver address and is adapted to receive the identical power control signal including the single general power demand. This is a further possibility to reduce the technical effort, since only one control signal is provided to set the driver devices to different power levels.

In a preferred embodiment, the driver unit has one control address for receiving the power control signal. This is a possibility to drive the driver unit as a whole with low technical effort, since the driver unit can be connected to any control bus and forms merely a single load that can be controlled via the one control address.

In a preferred embodiment, the driver devices are adapted to determine the respective individual power level on the basis of the amount of driver devices incorporated in the driver unit. This is a possibility to set the individual power level of each driver device without a separate control signal on the basis of the general power signal, since a certain amount of driver devices can be activated in order to achieve the respective power level.

In a preferred embodiment, each of the driver devices is adapted to determine the respective individual power level on the basis of an individual number of the respective driver device in the row of driver devices within the driver unit. This is a possibility to determine the individual power level of each driver device with low technical effort, since the driver devices can be activated consecutively in a row depending on the demanded general power level. The information how many driver devices are incorporated in the driver unit and the respective row-number are available for each driver device so that the individual power level can be determined accordingly.

In a preferred embodiment, an amount of activated driver devices providing electrical power to the load elements is determined on the basis of the general power signal and the amount of driver devices incorporated in the driver unit. This is a possibility to provide a deep dimming of the driver unit, since the amount of activated driver devices can be set precisely according to the general power signal.

In a preferred embodiment, the driver devices are adapted to determine a gain of the individual power level provided by the activated driver devices on the basis of the amount of activated driver devices. This is a possibility to provide a precise power level, since the gain of the driver devices is adapted to the amount of activated driver devices.

In a preferred embodiment, the driver devices are further adapted to determine the gain on the basis of the amount of driver devices incorporated in the driver unit. This is a further possibility to set the overall power level to a precise value with low technical effort.

In a preferred embodiment, the driver devices are adapted to determine the power level individually if the general power level is below a predefined power level. This is a possibility to provide a dimming level deeper than the lowest possible dimming level of all driver devices, since certain driver devices can be deactivated and the electrical power provided by the activated driver devices can be adapted accordingly.

In a preferred embodiment, the driver devices are adapted to set the gain and the power level of each of the activated driver devices to an identical value. This is a possibility to reduce the technical effort and the control effort of each of the driver devices, since merely a single algorithm can be used to set the power level of each of the driver devices.

As mentioned above, the present invention provides a driver unit and a driving method for driving a load, wherein the individual driver devices provide an individual power level below a predefined power level so that a deeper dimming of the load connected to the driver unit can be achieved. In particular, individual driver devices can be switched off or deactivated in order to achieve the deeper dimming of the load. The technical effort is reduced, since each of the driver devices determines the power level to be provided to the respectively connected load element individually on the basis of the single power command by means of an algorithm which considers the overall amount of driver devices incorporated in the driver unit, the individual number of the respective driver device and the lowest possible dimming level of each of the driver devices so that each of the driver devices are set to a certain power level depending on the general power level requested from the driver device. Hence, a deeper dimming of the load is possible with low technical effort.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
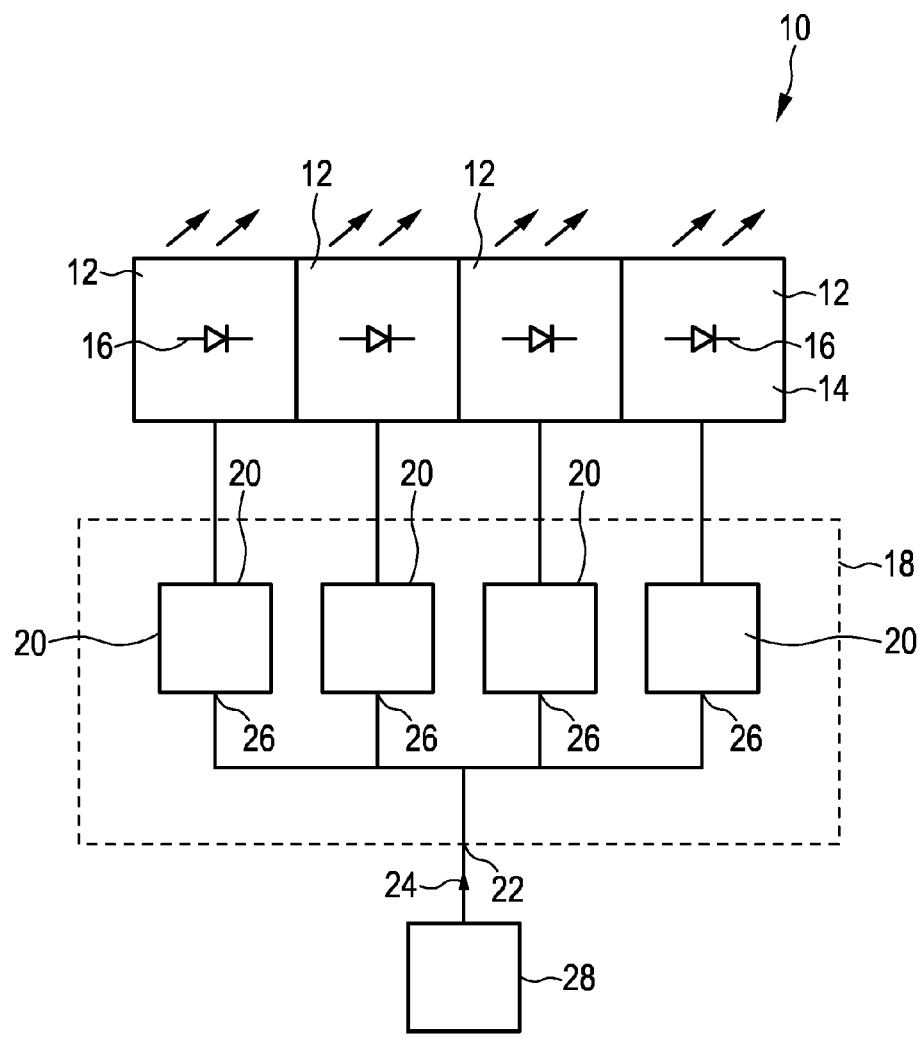
FIG. 1 shows a schematic block diagram of a driver unit connected to a luminaire comprising a plurality of lighting elements.

FIG. 1 shows a light unit for emitting light generally denoted by 10. The light unit 10 comprises a plurality of lighting devices 12, which are disposed on a PCB board 14. The lighting devices 12 each comprises a plurality of lighting elements 16, which are preferably LEDs and connected to each other as an LED string. The lighting devices 12 are steered in the same direction or pointed to the same area in order to provide a uniform illumination.

The light unit 10 further comprises a driver unit 18 comprising a plurality of driver devices 20 each connected to one of the lighting devices 12 for providing electrical power to the lighting devices 12 and driving the lighting devices 12 independently. The driver unit 18 comprises a control interface 22 for receiving a power control signal 24. Each driver device 20 comprises a driver interface 26 connected to the control interface 22. The driver devices 20 each receive the power control signal 24 via the driver interface 26 in order to each determine a level of the electric power provided to the respective lighting device 12.

The power control signal 24 comprises a single general power demand or request corresponding to the electrical power which shall be provided by the light unit 10 in general. The driver interfaces 26 each have an identical address within the driver unit 18, so that each driver device 20 receives the identical power control signals 24 including the single general power demand as information or signal. The driver interfaces 26 are accessible via the control interface 22 by means of a control protocol like DMX so that the light unit 10 is accessible via a light unit address of the control interface 22. The power control signal 24 may be provided by a central control unit 28 separately from the light unit 10 or integrated in the light unit 10. Alternative protocols to DMX standard may be used like DALI, IP, ArtNet, ACN and sACN.

The lighting elements 16 are steered in the same direction and arranged randomly within the light unit 10 and/or arranged randomly on the PCB board 14 so that the light emitted from the lighting elements 16 is mixed and it is not visible which lighting element 10 is controlled by which driver device 20. Hence, a dimming of the light emitted by the light unit 10 can be achieved by switching certain lighting devices 12 on and off as described in the following.

The driver devices 20 each determine the electrical power provided to the respectively connected lighting devices 12 on the basis of the power control signal 24 which includes a single general power demand to be set by the light unit 10 and which is provided to each of the driver devices 20 as an identical signal. The driver devices 20 each provide above a predefined power level an identical power level to each of the lighting devices 12. The predefined power level corresponds to the minimum power level of each of the driver devices 20 so that a continuous dimming below the predefined power level of all driver devices 20 is not possible. In the case of power levels below the predefined power level, the amount of activated driver devices 20 is reduced so that the overall light intensity emitted by the light unit 10 can be reduced below the predefined power level defined by the minimum power level of the driver devices 20. A minimum power level can be achieved if only one driver device 20 is activated and provides its lowest possible power level to the respectively connected lighting device 12. The other driver devices 20 are in this case deactivated and do not provide electrical power to the respectively connected lighting device 12.

Each of the driver devices 20 determine the respective electrical power level on the basis of the single general power signal, the lowest possible dimming level of the driver devices 20, the amount of driver devices 20 incorporated in the driver unit 18 and on the basis of the number of the respective driver device 20 within the driver unit 18. Hence, the driver devices 20 can be set to individual power levels and e.g. can be switched on consecutively if the single general power signal is increased and can be switched off consecutively if the single general power level is decreased.

If the driver unit 18 comprises four driver devices 20 and the lowest dimming level of the driver devices 20 is 10%, the overall dimming level of the light unit 10 can be reduced to a total output of 2.5% if only one of the driver devices 20 is activated and provides its minimum power level i.e. 10% of its maximum power level to the respective lighting device 12. Hence, a deep dimming of the light unit 10 can be achieved with low technical effort.

The lighting devices 12 are preferable high-power LEDs which can be dimmed in 256 levels.

Figure 2:
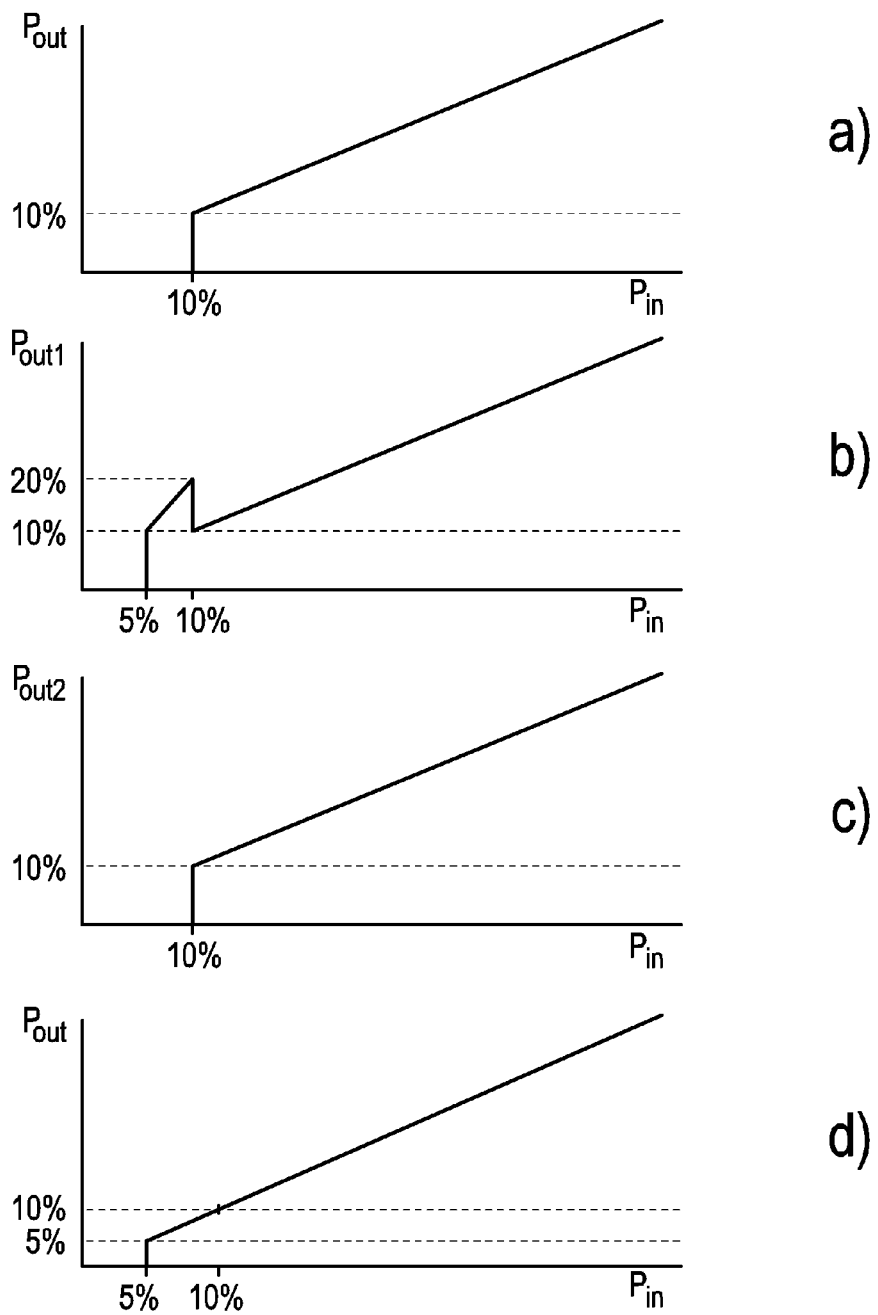
FIG. 2 shows power diagrams for illustrating the dimming of the load with two individual driver devices.

In FIG. 2 schematic power diagrams are shown for light units 10 having a single driver device 20 or two driver devices 20 for providing a deeper dimming level.

In FIG. 2a the power output $P_{out}$ dependent on the power demand or power input $P_{in}$ of a usual driver unit 18 including one driver device 20 is shown. The minimum power level of the driver device 20 is 10% so that a power output of the driver unit 18 below 10% is not possible.

The power output $P_{out}$ of two driver devices 20 incorporated in the driver unit 18 dependent on the power demand or input $P_{in}$ are shown in FIGS. 2b and 2c. For a requested power input $P_{in}$ below 10%, only one of the driver devices 20 is switched on or activated. The power output $P_{out}$ is continuously increased to 20% so that the light unit 10 emits an overall illumination level of 10%. When the power demand or input $P_{in}$ requested from the light unit 10 reaches 10%, the second driver device 20 is activated as shown in FIG. 2c. At this point, the power level of the first driver device 20 is reduced from 20% to 10% so that both driver devices 20 each provide 10% and the overall light emission of the light unit 10 is set to 10%. Above this minimum dimming level of the driver devices 20 of 10%, the two driver devices 20 are driven linearly and identically. The overall power output $P_{out}$ dependent on the power input $P_{in}$ is shown in FIG. 2d as a superimposition of the electrical power provided by the two driver devices as shown in FIGS. 2b and c.

Hence, a deeper dimming level can be achieved by activating only one of the driver devices 20 as shown in FIG. 2b and in this case a dimming level of 5% is possible. Further, the gain of the power output $P_{out}$ of the driver devices 20 is dependent on the amount of activated driver devices 20, wherein the gain decreases with an increasing amount of activated driver devices 20.

Figure 3:
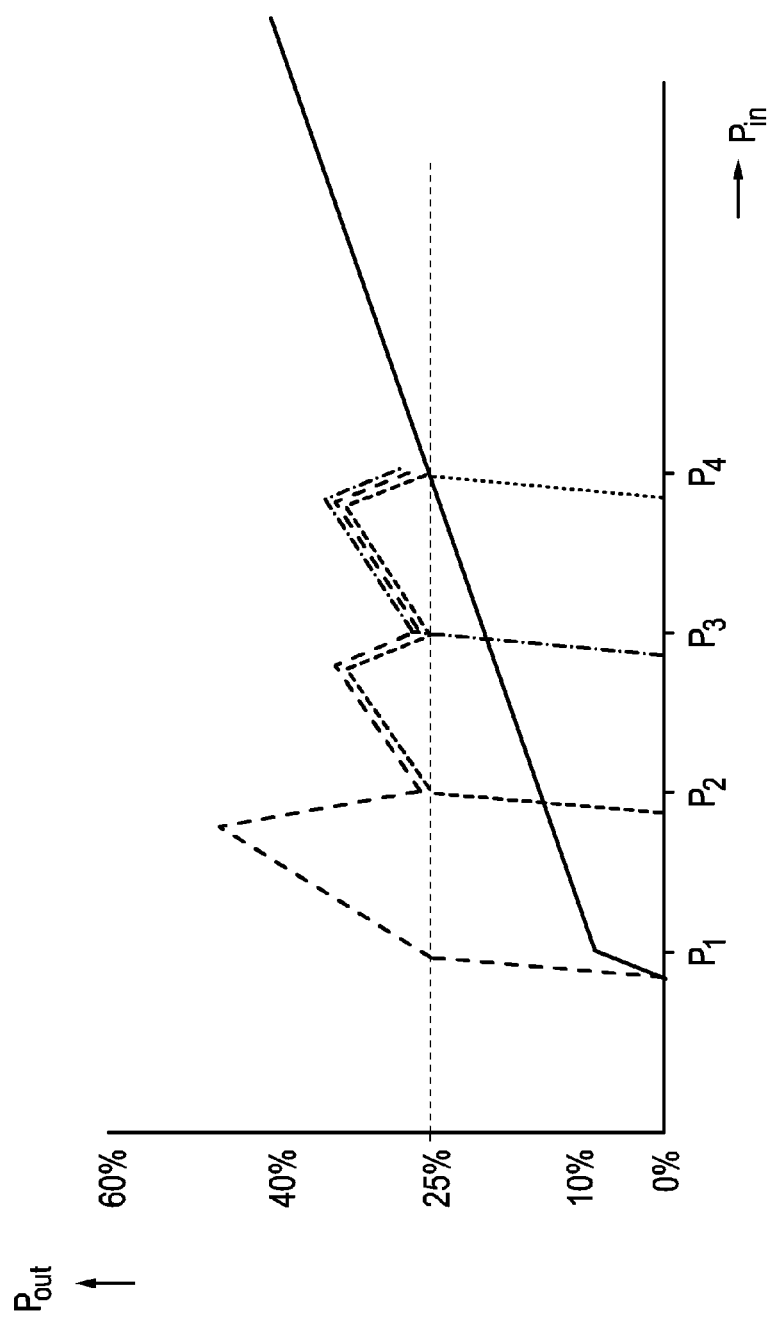
FIG. 3 shows a power diagram for dimming a load by means of a driver unit comprising four separate driver devices.

In FIG. 3 a power output $P_{out}$ of the light unit 10 dependent on the power demand or input $P_{in}$ is shown for the case that four driver devices 20 are incorporated in the driver unit 18 each having a minimum power level of 25%. The overall power output $P_{out}$ of the light unit 10 is shown as a solid line, wherein the individual power output of the four driver devices 20 are shown as differently dashed lines.

The lowest power output $P_{out}$ that can be provided by the light unit 10 is in this case is 6.25% as shown at $P_1$ in FIG. 3. For this demanded power level, a first of the driver devices 20 is activated while the other driver devices 20 are deactivated. The power output of the single activated driver device 20 is increased continuously until the power input of 12.5% is reached at $P_2$. In this case the power output of the first driver device 20 is reduced to the lowest dimming level of 25% and a second of the driver devices 20 is activated. The power output of the two activated driver devices 20 is continuously increased simultaneously wherein each driver device 20 has the same power output and provides the identical power gain. When the power input level of 18.75% is reached at $P_3$, the power output of the two activated driver devices 20 is reduced to the lowest dimming level of 25% and a third of the driver devices 20 is activated. The power output of the three activated driver devices 20 is increased continuously each providing the same power level and each having the identical power gain. At a power input level of 25%, which is reached at $P_4$, the last driver device 20 or the fourth driver device 20 is activated so that each of the driver devices 20 emits a power level of 25% and the overall power level of the light unit 10 is 25%. Hence, a deep dimming of the light unit 10 can be achieved by consecutively activating (or deactivating) the driver devices 20.

The gain of the power output is dependent on the amount of activated driver devices 20 for the different power level, wherein the gain is decreased with an increasing amount of activated driver devices 20. In particular, the gain is decreased in a discrete manner dependent on the amount of activated driver devices 20.

The variation of the gain of the power output dependent on the power input e.g. for the case that only the first driver device 20 of four driver devices is activated needs to be four times higher than the gain of each of the driver devices 20 if all driver devices 20 are activated, so that a continuously raising overall power level of the light unit can be provided. Correspondingly, the power output gain is reduced with an increasing amount of activated driver devices 20, in particular in a discrete manner.

Since each of the driver devices 20 uses an individual algorithm for determining the power output to be provided to the respectively connected lighting device 12 on the basis of the amount of integrated driver devices 20, the minimum dimming level and the number of the respective driver device 20 within the driver unit 18, a central control unit for driving the driver devices 20 can be omitted.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A driver unit for driving a load where the load includes a plurality of load elements, the driver unit comprising:
    a plurality of driver devices connected to the plurality of load elements, respectively, for driving the plurality of load elements individually,
    a control interface for receiving a power control signal including a single general power demand to be set by the driver unit,
    wherein each driver device comprises a driver interface connected to the control interface for receiving the power control signal including the single general power demand, and
    wherein each driver device is adapted to determine an individual power level for a respective one of the load elements on the basis of the single general power demand and to drive said respective one of the load elements according to the individual power level, so that at least one of the plurality of driver devices, set for the individual power level, is configured to be switched off when the single general power demand is decreased to lesser than a minimum power level of said at least one of the plurality of the driver devices.

2. The driver unit as claimed in claim 1, wherein each of the driver devices is connected to a respective one of the load elements, for driving the respective one of the load elements individually.

3. The driver unit as claimed in claim 1, further comprising a control unit for providing the power control signal to the driver devices including the single general power demand.

4. The driver unit as claimed in claim 1, wherein each driver device has the same driver address and is adapted to receive the identical power control signal including the single general power demand.

5. The driver unit as claimed in claim 1, wherein the driver unit has one control address for receiving the power control signal.

6. The driver unit as claimed in claim 1, wherein the driver devices are adapted to determine the respective individual power level on the basis of the amount of driver devices incorporated in the driver unit.

7. The driver unit as claimed in claim 1, wherein each of the driver devices is adapted to determine the respective individual power level on the basis of an individual number of the respective driver device within the driver unit.

8. The driver unit as claimed in claim 1, wherein the driver devices are adapted to determine the respective individual power level on the basis of a lowest power level that can be provided by each of the driver devices.

9. The driver unit as claimed in claim 1, wherein the driver devices are adapted to determine the individual power level provided by a plurality of activated driver devices on the basis of a quantity of the activated driver devices.

10. The driver unit as claimed in claim 9, wherein the driver devices are further adapted to determine a gain of the individual power level of the driver devices on the basis of the quantity of the driver devices incorporated in the driver unit.

11. The driver unit as claimed in claim 1, wherein the driver devices are adapted to set the individual power level of each of the driver devices to an identical value greater than a predefined power level when all of the driver devices are activated.

12. A method for driving a load including a plurality of load elements, comprising the steps of:
    providing a power control signal to a plurality of driver devices for driving the load elements, wherein the power control signal includes a single general power demand,
    determining, by each of the driver devices, an individual power level for a respective one of the load elements on the basis of the single general power demand and on the basis of a quantity of the driver devices, and
    driving the load elements individually according to the individual power level so that at least one of the plurality of driver devices, set for the individual power level, is configured to be switched off when the single general power demand is decreased to lesser than a minimum power level of said at least one of the plurality of the driver devices.

13. A lighting unit comprising a plurality of lighting elements including one or more LEDs and the driver unit as claimed in claim 1 for driving the plurality of lighting elements.

14. The lighting unit of claim 13, wherein the load elements are the lighting elements.

* * * * *